United States Patent Office 3,036,983
Patented May 29, 1962

3,036,983
ZEOLITE AND CURING ACCELERATOR, CHLOROPRENE POLYMER COMPOSITION CONTAINING SAME AND PROCESS OF CURING
Francis M. O'Connor, Kenmore, N.Y., assignor to Union Carbide Corporation, a corporation of New York
No Drawing. Filed Apr. 15, 1958, Ser. No. 728,515
23 Claims. (Cl. 260—41.5)

This invention relates to curing accelerators for neoprene rubber formulations. More particularly, this invention is an efficient and readily controlled method of utilizing powerful curing accelerators such as pyrocatechol in neoprene rubber formulations.

Neoprene is the generic term applied to the group of synthetic elastomers based on the polymers of chloroprene, that is, 2-chlorobutadiene-1,3. Two particularly important classes of polychloroprene polymers are designated type G neoprenes and type W neoprenes. Type G neoprenes are sulfur-modified chloroprene-based synthetic elastomers and type W neoprenes are stabilized non-sulfur modified chloroprene-based synthetic elastomers. While the basic physical properties of cured neoprene are similar to those of natural rubber, the former surpasses rubber in certain other properties. For example, neoprene vulcanizates exhibit improved resistance to deterioration by oils, solvents, oxidation, sunlight, flexing, heat and flame.

The crosslinking mechanism in neoprene vulcanization or cure is different from that in the curing of styrene-butadiene rubber and natural rubber. Metallic oxides such as zinc oxide and magnesium oxide are the most widely used curing agents for neoprene. The exact mechanism of the crosslinking reaction in neoprene, however, is not completely understood.

Many types of neoprene are available. The group of general-purpose neoprene formulations includes two classes, the sulfur-modified (type G) and the non-sulfur-modified (type W). The sulfur-modified neoprenes generally need only metallic oxides for curing. The non-sulfur-modified types require both metallic oxides and curing accelerators for the development of acceptable curing characteristics and vulcanizate properties. In processing neoprene, as well as other rubber compounds, the primary function of the accelerator is to increase the rate of curing. Accelerators can also affect the physical properties of the vulcanizate; in general the tendency is toward an improvement in and uniformity of such properties.

Neoprene, like many other rubbers, is processed at elevated temperatures. During this processing, premature cure or "scorch" is a serious problem. Ideally, the accelerator should not become active during the various stages of processing such as milling, extruding and molding, that is, a long scorch time is desirable. However, the accelerator should be available upon demand to bring about rapid curing at the higher curing temperature, that is, short cure time.

Accelerators which were available to the prior art, such as di-orthotolylguanidine salt of dicatechol borate, and a resonance hybrid consisting of 2-mercaptoimidazoline and ethylene thiourea, gave a moderate increase in the cure rate of non-sulfur-modified neoprenes which was accompanied by an undesirable decrease in the scorch time.

The most efficient curing accelerators such as pyrocatechol (catechol, 1,2-benzenediol), alkyl-substituted catechols and certain other polysubstituted benzene compounds were seldom used in the prior art because the very short scorch time made processing difficult.

It is the principal object of this invention to provide a method for utilizing powerful accelerators to obtain rapid rates of cure in non-sulfur-modified neoprene rubber formulations without a concomitant undesirable decrease in the scorch time.

It is a further object of this invention to provide means for varying the scorch time at a substantially constant rate of cure or for varying the rate of cure at a substantially constant scorch time, thus introducing a desirable flexibility into the processing conditions for these neoprene rubber formulations.

The invention is based upon the discovery that certain solid adsorbents may be used to introduce catechols or other powerful accelerators into the neoprene rubber formulation in an adsorbed state, whereby these accelerators are withheld from the formulation during the early stages of processing, thus preventing premature curing ("scorching") of the system. When it is desired to cure (vulcanize) the system, the accelerator can be released from the adsorbent in at least one active form by the application of heat or by displacement with a more strongly adsorbed material. An increase in the rate of cure can thus be obtained without an undesirable decrease in the scorch time. The possible active forms of the released accelerator include accelerator molecules and free radicals and ions derived from the molecules. The exact nature of the released accelerator is not known.

To be useful in the present invention the solid adsorbent must be capable of adsorbing essentially all of the accelerator internally, that is, within the pores of the adsorbent. Surface adsorption alone is not satisfactory since the accelerator is not then isolated from the formulation and may be prematurely released into the rubber formulation during processing and cause premature curing. In general, natural and synthetic crystalline zeolites (molecular sieves) are preferred because of their uniform physical properties and desirable adsorption characteristics. It is entirely unexpected that the crystalline zeolitic molecular sieves would adsorb the very powerful curing accelerators of this invention so strongly as to prevent undesirable premature curing. If even small amounts of the very powerful accelerators were released during the low temperature processing of the neoprene formulations, a serious decrease in scorch time would result.

The structure and unique properties of synthetic crystalline zeolitic molecular sieves are described in several publications, for example, Breck et al., J. Am. Chem. Soc., 78, 2338 (1956), Breck et al., J. Am. Chem. Soc., 78, 5963 (1956), and Reed et al., J. Am. Chem. Soc., 78, 5972 (1956). Synthetic crystalline zeolitic molecular sieves are also described in U.S. patents and co-pending U.S. patent applications. For example, zeolite A is described in U.S. Patent 2,882,243, issued April 14, 1959, zeolite X is described in U.S. Patent 2,882,244, issued April 14, 1959, zeolite L is described in application Serial No. 711,565, filed January 28, 1958, and zeolite Y is described in application Serial No. 728,057, filed April 14, 1958. To facilitate an understanding of the terms used in the examples and claims appearing below, certain of the synthetic zeolitic molecular sieves amenable to the present invention are now more fully described. As used herein, the expressions "zeolite X," "zeolite Y," and the like mean the chemical compositions and X-ray diffraction patterns herein specifically set forth or referenced to the issued patent.

The chemical formula for zeolite Y expressed in terms of oxides mole ratios may be written as $$0.9 \pm 0.2 Na_2O : Al_2O_3 : WSiO_2 : XH_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in the following tables. The values for the interplanar spacing, $d$, are expressed in angstrom units. The relative intensity of the lines of the X-ray powder diffraction data are expressed as VS, very strong; S, strong; M, medium; W, weak; and VW, very weak.

| nkl | $h^2+k^2+l^2$ | d in A | Intensity |
|---|---|---|---|
| 111 | 3 | 14.3 –14.4 | VS |
| 220 | 8 | 8.73– 8.80 | M |
| 311 | 11 | 7.45– 7.50 | M |
| 331 | 19 | 5.67– 5.71 | S |
| 333, 511 | 27 | 4.75– 5.08 | M |
| 440 | 32 | 4.37– 4.79 | M |
| 620 | 40 | 3.90– 4.46 | W |
| 533 | 43 | 3.77– 3.93 | S |
| 444 | 48 | 3.57– 3.79 | VW |
| 551, 711 | 51 | 3.46– 3.48 | VW |
| 642 | 56 | 3.30– 3.33 | S |
| 553, 731 | 59 | 3.22– 3.24 | W |
| 733 | 67 | 3.02– 3.04 | M |
| 660, 822 | 72 | 2.91– 2.93 | M |
| 555, 751 | 75 | 2.85– 2.87 | S |
| 840 | 80 | 2.76– 2.78 | M |
| 753, 911 | 83 | 2.71– 2.73 | W |
| 664 | 88 | 2.63– 2.65 | M |
| 931 | 91 | 2.59– 2.61 | M |
| 844 | 96 | 2.52– 2.54 | VW |
| 862; 10, 2, 0 | 104 | 2.42– 2.44 | VW |
| 666; 10, 2, 2 | 108 | 2.38– 2.39 | M |
| 775; 11, 1, 1 | 123 | 2.22– 2.24 | VW |
| 880 | 128 | 2.18– 2.20 | W |
| 955; 971; 11, 3, 1 | 131 | 2.16– 2.18 | VW |
| 973; 11, 3, 3 | 139 | 2.10– 2.11 | W |
| 884; 12, 0, 0 | 144 | 2.06– 2.07 | VW |
| 886; 10, 8, 0; 12, 4, 2 | 164 | 1.93– 1.94 | VW |
| 10, 8, 2 | 168 | 1.91– 1.92 | VW |
| 995; 13, 3, 3 | 187 | 1.81– 1.82 | VW |
| 11, 7, 5; 13, 5, 1 | 195 | 1.77– 1.78 | VW |
| 10, 8, 6; 10, 10, 0; 14, 2, 0 | 200 | 1.75– 1.78 | W |
| 997; 11, 9, 3 | 211 | 1.70– 1.71 | W |

The composition of zeolite L, expressed in terms of mole ratios of oxides, may be represented as follows:

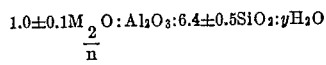

wherein "M" designates a metal, "$n$" represents the valence of "M"; and "$y$" may be any value from 0 to about 7.

The more significant $d$ (A.) values, i.e., interplanar spacings, for the major lines in the X-ray diffraction patterm of zeolite L, are given below in the following table.

$d$ (A.)

16.1 ±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

To be useful in the present invention, it is necessary that the pore size of the natural or synthetic crystalline zeolite be large enough to permit at least a substantial portion of the accelerator molecules of this invention to be adsorbed internally. Examples of crystalline zeolites which have a pore size large enough to adsorb internally pyrocatechol and the other powerful accelerators of this invention are synthetic zeolites X, L and Y and the natural zeolite faujasite. Thus, the pyrocatechol molecule, which has a critical dimension of about 6.6 Angstrom units, can be adsorbed internally by molecular sieve type sodium X (that is the sodium form of synthetic zeolite X) but not by type Sodium A, the latter having an effective pore diameter less than about 6.6 Angstrom units.

Curing accelerators which may be used in the present invention include dihydroxy benzenes, such as pyrocatechol and resorcinol; alkyl-substituted dihydroxy benzenes such as ethyl catechol and ethyl resorcinol; hydroxy-substituted benzoic acids, such as salicyclic acid and p-hydroxy benzoic acid; di-isonitroso-substituted benzenes, such as paraquinone dioxime and 2,3-di-isonitrosotoluene; and di-isocyano-substituted benzenes such as ortho-di-isocyanobenzene and tolylene-2,4-di-isocyanate.

In one embodiment of this invention, a crystalline molecular sieve zeolite previously loaded with an accelerator is added to the rubber formulation. The zeolite holds the accelerator in the adsorbed state until vulcanization temperatures are reached. This is a preferred embodiment of the invention. In another embodiment of this invention, the accelerator and zeolite are added separately to the rubber formulation. The zeolite then adsorbs the accelerator in situ and holds it in the adsorbed state during low temperature processing and until curing temperatures are reached.

One embodiment of the present invention is set forth in the experimental data of Table A, below, wherein the effects on scorch time and rapidity of cure for no accelerator, accelerators without solid adsorbent, and pyrocatechol adsorbed on various types of molecular sieves are compared. The nature of the neoprene formulation and the details of the experimental methods are discussed immediately following the table.

Table A shows that the neoprene formulation cured very slowly in the absence of accelerators. When a resonance hybrid of 2-mercaptoimidazoline and ethylene thiourea or pyrocatechol was added in the conventional manner, a very rapid cure resulted at the expense of a sharp decrease in scorch time. Adsorption of pyrocatechol on molecular sieves types calcium X and sodium X, however, resulted in a substantial increase in scorch time while a very rapid rate of cure was maintained.

Table A also shows that when pyrocatechol was loaded on molecular sieve type sodium A, a smaller pore size material, an increase in scorch time over that for the conventional means of accelerator addition resulted. Comparison with the scorch time data for molecular sieve types sodium X and calcium X shows that type sodium A is not satisfactory for the practice of the invention. Apparently the smaller pore size material cannot adsorb substantial amounts of pyrocatechol internally and subsequently cannot withhold such amounts of pyrocatechol from the system to be cured.

Pyrocatechol preloaded on silica gel gave scorch times similar to those obtained using pyrocatechol on sodium A, apparently because the non-crystalline gel cannot retain internally substantial quantities of the accelerator.

TABLE A.—EFFECT OF MOLECULAR SIEVE CARRIERS ON CURE AND SCORCH CHARACTERISTICS OF TYPE W NEOPRENE

| Accelerator | Conc. of accelerator (p.h.r.[1]) | Molecular sieve type | Weight-percent pyrocatechol on molecular sieve | Mooney scorch time [2] at 250° F. (min. to 5 pt. rise) | Press cure at 307° F. stress at 300% elongation (p.s.i.) | | |
|---|---|---|---|---|---|---|---|
| | | | | | 5 min. | 7 min. | 10 min. |
| None | | | | 30 | ([3]) | ([3]) | ([3]) |
| 2-mercaptoimidazoline-ethylene thiourea | 0.3 | | | 8.5 | 965 | 1,112 | 1,263 |
| Pyrocatechol | 0.2 | | | 4 | 1,668 | | 1,756 |
| Do | 0.2 | Calcium X | 15.0 | 12 | 1,128 | 1,455 | 1,558 |
| Do | 0.2 | Sodium X | 12.5 | 17 | 998 | 1,316 | 1,570 |
| Do | 0.2 | do | 15 | 18 | 1,039 | 1,653 | 1,711 |
| Do | 0.2 | Sodium A | 15 | 8 | | 1,261 | 1,640 |

[1] Parts of accelerator per hundred parts of rubber.
[2] Number of minutes required (at a given temperature) to reach a 5-point increase in the viscosity of the sample above the minimum viscosity of that sample as determined in a Mooney viscometer.
[3] No cure—Modulus was 462 p.s.i. after 15 minutes at 307° F.

The constituents of the neoprene formulation used in the experiments recorded in Table A, above, are listed in Table B. The neoprene rubber used is designated "type W" in the trade. The W types of neoprene, which includes W, WRT, and WHV, contain no sulfur, sulfur compounds or other compounds which could decompose to release free sulfur or form accelerators. The neoprene formulation of Table B is a typical formulation used to define the cure and scorch characteristics of commercial accelerators.

Many other compounding ingredients such as fillers of clay or other materials may be added to develop specific properties in the final product. The present invention is not limited to any particular member of the W class of neoprenes or to any particular formulation recipe, but is applicable to formulations containing any non-sulfur-modified (W type) neoprene rubber and a wide variety of compounding ingredients.

TABLE B.—A BASIC RECIPE FOR TYPE W NEOPRENE FORMULATIONS

| Ingredient | Amount used, parts | Function |
|---|---|---|
| Neoprene type W | 100 | Polymer. |
| Semi-reinforcing carbon black (SRF) | 30 | Reinforcing agent. |
| Stearic acid | 0.5 | Activator and softener. |
| Zinc oxide | 5.0 | Vulcanizing agent. |
| Magnesium oxide | 2.0 | Do. |
| Accelerator | Variable | Shorten cure time. |

A typical experiment using this basic neoprene formulation is described in Example I.

*Example I*

COMPOUNDING OF TYPE W NEOPRENE FORMULATION USING PYROCATECHOL-LOADED MOLECULAR SIEVE TYPE SODIUM X AS ACCELERATOR

From a masterbatch consisting of 100 parts neoprene type W and 30 parts of semi-reinforcing carbon black, 390 grams were banded on a 6″ x 12″ laboratory 2-roll mill. To this was added 15.0 grams of zinc oxide, 6.0 grams of magnesium oxide, 1.5 grams of stearic acid and 4.0 grams of pyrocatechol-loaded molecular sieve type sodium X. The formulation was compounded according to the ASTM standard mixing procedure (reference: ASTM Standards on Rubber Products D–15–55T).

After mixing, the sample was removed from the roll mill in a sheet and a sample cut for determination of Mooney scorch time at 250° F. Mooney scorch time at a given temperature is the number of minutes required to reach a 5-point increase in the viscosity of the sample above the minimum viscosity of that sample as determined in a Mooney shearing disk viscometer. This measurement was conducted according to ASTM Standards on Rubber Products D–927–55T.

The physical properties of the vulcanized product were obtained after curing 6″ x 6″ x 0.075″ slabs of rubber in a standard test mold at 307° F. for measured periods of time. The tensile tests were conducted according to ASTM Standards on Rubber Products D–412–51T.

The Mooney scorch time at 250° F. for this formulation was 18 minutes. The physical properties of cured samples after various periods of time at 307° F. are given below:

| Cure time (minutes) | Stress at 300% elongation (p.s.i.) | Ultimate tensile (p.s.i.) | Ultimate elongation (percent) |
|---|---|---|---|
| 5 | 1,039 | 2,701 | 575 |
| 7 | 1,673 | 3,033 | 470 |
| 10 | 1,711 | 3,069 | 475 |
| 15 | 1,665 | 2,758 | 425 |

These data indicate that a well cured product was obtained in 7 minutes at 307° F. In the absence of an accelerator, very little cure was obtained even in 15 minutes at 307° F. Addition of pyrocatechol alone, while it produced a rapid cure, gave a Mooney scorch time of only 4 minutes compared to 18 minutes for pyrocatechol adsorbed on molecular sieve type sodium X, as shown in Table A.

The accelerator may be loaded into the adsorbent by vapor phase adsorption or other convenent method. A typical example of loading the accelerator is given in Example II.

*Example II*

VAPOR PHASE ADSORPTION OF PYROCATECHOL ON MOLECULAR SIEVE

In a vacuum desiccator were placed 50 grams of activated molecular sieve type sodium X powder contained in a Petri dish and 12 grams of pyrocatechol contained in a small beaker. The desiccator was evacuated, sealed off and heated in an oven at 115° C. for 18 hours. During this time the molecular sieve powder adsorbed 10.56 grams of pyrocatechol, equivalent to 17.5 wt.-percent loading.

The embodiment of this invention wherein accelerator-loaded adsorbent is added to the rubber formulation is further exemplified by the data in Table C. The experimental methods were similar to those described in Example I, above.

Table C shows that at a constant concentration of pyrocatechol in the recipe the scorch time was controlled by the loading of pyrocatechol on the activated molecular sieve. Increasing the amount of pyrocatechol-loaded sodium X powder in the recipe at a constant loading of pyrocatechol, on the other hand, resulted in an increase in cure rate with little effect on the scorch time. It is thus a basic feature of the invention that the scorch time necessary for adequate processing safety in neoprene compounding can be obtained by choosing the appropriate loading of accelerator in the solid adsorbent (that is, the accelerator-adsorbent ratio), while the cure rate can be controlled by the amount of loaded adsorbent powder in the recipe. This independent control of cure rate and scorch time may be obtained by adding previously activated crystalline zeolitic molecular sieve loaded with accelerator to the formulation or by adding separate quantities of accelerator and activated crystalline zeolitic molecular sieve to the formulation and allowing adsorption to take place in situ.

TABLE C.—EFFECT OF PYROCATECHOL LOADING AND CONCENTRATION OF LOADED SODIUM X POWDER ON CURE AND SCORCH CHARACTERISTICS OF TYPE W NEOPRENE

| Weight-percent pyrocatechol on sodium X | P.h.r. pyrocatechol (on sodium X) in recipe | P.h.r. pyrocatechol-loaded sodium X in recipe | Mooney scorch time at 250° F. (min. to 5 pt. rise) | Press cure at 307° F., stress at 300% elongation (p.s.i.) | | |
|---|---|---|---|---|---|---|
| | | | | 5 min. | 7 min. | 10 min. |
| 5 | 0.2 | 4.0 | 42 | 564 | 703 | 883 |
| 10 | 0.2 | 2.0 | 33.5 | 654 | 1,190 | 1,440 |
| 11 | 0.2 | 1.8 | 25 | 703 | 1,250 | 1,280 |
| 12.5 | 0.2 | 1.6 | 17 | 998 | 1,316 | 1,570 |
| 15 | 0.2 | 1.3 | 10.5 | 974 | 1,306 | 1,440 |
| 20 | 0.2 | 1.0 | 8 | 1,164 | 1,308 | 1,519 |
| 12.5 | 0.1 | 0.8 | 14 | | 791 | 1,211 |
| 12.5 | 0.15 | 1.2 | 13 | | 1,237 | 1,299 |
| 12.5 | 0.2 | 1.6 | 18.5 | | 1,353 | 1,475 |
| 12.5 | 0.25 | 2.0 | 16.5 | | 1,367 | 1,610 |
| 12.5 | 0.2 | 2.4 | 18.5 | | 1,504 | 1,745 |

A useful range of loading for pyrocatechol on molecular sieve is from 5 to 20 weight percent, with a range of from about 10 to about 15 weight percent usually preferred for the best combination of cure and scorch characteristics. The quantity of loaded molecular sieve powder added to the recipe may vary from about 0.8 to about 4 phr., with a preferred range of from about 1.0 to about 2.5 phr.

The procedure described above and illustrated by Table C was never before possible with conventional accelerators or with pyrocatechol, and many applications of the method of the invention to vulcanization of non-sulfur-modified (W type) of neoprene rubber are possible.

The embodiment of this invention wherein the accelerator and adsorbent are added separately is set forth by the data in Table D. In this embodiment the adsorbent adsorbs the accelerator in situ and holds it inactive until vulcanization temperatures are reached. Table D shows that the scorch time of formulations in which the two materials are added separately is a function of the ratio of adsorbent to accelerator. Thus, the more adsorbent present, the longer the scorch time. The rate of cure is decreased slightly as the amount of adsorbent is increased.

Table D further shows that when the accelerator and adsorbent are added separately the range of effective loading of pyrocatechol on molecular sieves, such as sodium X is preferably from about 7 to about 17 weight percent, depending upon the particular processing conditions. Also, molecular sieves such as types calcium A and sodium A give shortened scorch times, apparently because substantial amounts of pyrocatechol cannot be adsorbed internally in the smaller pores characteristic of these sieves.

Addition of separate quantities of pyrocatechol and silica gel resulted in scorch times similar to those obtained when separate quantities of pyrocatechol and calcium A or sodium A were employed. The apparent reason for this result is that the non-crystalline gel cannot retain substantial quantities of the accelerator internally and thus cannot withhold the accelerator from the system until curing temperatures are reached.

The experimental procedures used in obtaining the data in Table D are illustrated in Example III which follows the table.

TABLE D.—EFFECT OF PYROCATECHOL AND MOLECULAR SIEVE ADDED SEPARATELY TO THE FORMULATION
[0.3 phr. pyrocatechol added to each formulation]

| Molecular sieve type | P.h.r. molecular sieve added | Calculated loading of pyrocatechol on molecular sieve, weight percent | Mooney scorch time at 250°F. (min. to 5 pt. rise) | Press Cure at 307° F., stress at 300% elongation (p.s.i.) | | |
|---|---|---|---|---|---|---|
| | | | | 5 min. | 7 min. | 10 min. |
| Sodium X | 0.5 | 38 | 5 | 1,531 | 1,746 | 1,920 |
| Do | 1.0 | 23 | 5.5 | 1,544 | 1,746 | 1,928 |
| Do | 1.5 | 17 | 9.5 | 1,739 | 1,772 | 1,754 |
| Do | 2.2 | 12 | 14 | 1,539 | 1,753 | 1,724 |
| Do | 3.0 | 9.1 | 21 | 1,159 | 1,396 | 1,652 |
| Do | 3.0 | 9.1 | 21 | 1,268 | 1,550 | 1,707 |
| Sodium Y | 3.0 | 9.1 | 30 | 932 | 1,318 | 1,487 |
| Sodium X | 3.5 | 7.9 | 29 | 850 | 1,181 | 1,325 |
| Do | 4.0 | 7.0 | 9.5 | 1,561 | 1,600 | 1,707 |
| Sodium A | 3.0 | 9.1 | 7 | 1,831 | 1,927 | 1,976 |
| Calcium A | 3.0 | 9.1 | | | | |

*Example III*

COMPOUNDING OF TYPE W NEOPRENE FORMULATION WITH PYROCATECHOL AND MOLECULAR SIEVE TYPE SODIUM X ADDED SEPARATELY

From a masterbatch consisting of 100 parts neoprene type W and 30 parts of semi-reinforcing carbon black, 390 grams were banded on a 6″ x 12″ laboratory 2-roll mill. To this were added 15.0 grams of zinc oxide, 6.0 grams of magnesium oxide, 1.5 grams of stearic acid, 0.9 gram of pyrocatechol and 9.0 grams of activated molecular sieve type sodium X. The formulation was compounded according to the ASTM standard mixing procedure cited in Example I above.

After mixing, the sample was removed from the roll mill in a sheet and a sample cut for determination of Mooney scorch time at 250° F. The physical properties of the vulcanized product were obtained after curing 6″ x 6″ x 0.075″ slabs of rubber in a standard test mold at 307° F. for measured periods of time. The scorch and tensile tests were conducted according to the ASTM procedures cited in Example I above.

The Mooney scorch time at 250° F. for this formulation was 21 minutes. The physical properties of cured samples after various periods of time at 307° F. are given below:

| Cure time (minutes) | Stress at 300% elongation (p.s.i.) | Ultimate tensile (p.s.i.) | Ultimate elongation (percent) |
|---|---|---|---|
| 5 | 1,159 | 2,841 | 500 |
| 7 | 1,396 | 3,041 | 525 |
| 10 | 1,652 | 2,914 | 470 |

These data indicate that a well cured product was obtained in 7 minutes at 307° F. In the absence of an accelerator, very little cure was obtained even in 15 minutes at 307° F. Addition of pyrocatechol alone, while it produced a rapid cure, gave a Mooney scorch time of only 4 minutes compared to 21 minutes for pyrocatechol adsorbed in molecular sieve type sodium X.

The use of powerful curing accelerators other than pyrocatechol is illustrated by Table E and Example IV immediately following the table. The particular accelerators set forth in Table E are:

Salicylic acid

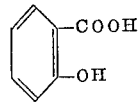

Para-quinone-dioxime

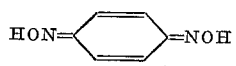

Tolylene-2,4-di-isocyanate

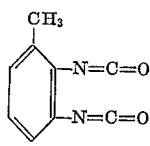

These compounds are illustrative of the general classes of operable curing accelerators referred to in column 4, lines 24–32 hereinabove.

All of the accelerators of this invention may be released from the crystalline zeolitic adsorbent by the application of heat. The rate of release increases with increasing temperature, and some accelerator may be released before the curing temperature is reached. That is, the release of the accelerator takes place over a range of temperature up to the curing temperature of the neoprene formulation.

Table E shows that when these powerful curing accelerators were added to the neoprene formulation in the conventional manner, a rapid cure resulted but the scorch time was relatively short. When these accelerators were adsorbed on molecular sieve type sodium X however, a substantial increase in scorch time was obtained while a rapid cure rate was maintained.

minutes. The physical properties after various periods of time at 307° F. are given below:

| Cure time (minutes) | Stress at 300% elongation (p.s.i.) | Ultimate tensile (p.s.i.) | Ultimate elongation (Percent) |
|---|---|---|---|
| 7 | 829 | 1,635 | 725 |
| 10 | 732 | 2,146 | 850 |
| 15 | 847 | 2,577 | 865 |

These data indicate that a well-cured product is obtained in 10 minutes at 307° F. In the absence of an accelerator, very little cure is obtained even in 15 minutes at 307° F. Addition of tolylene-2,4-di-isocyanate alone, while it produced a rapid cure, gave a Mooney scorch time of only 3.5 minutes compared to 10.5 minutes for the adsorbed sample.

The moisture content of the solid adsorbent which is subsequently loaded with accelerator has a pronounced effect on the performance of the loaded adsorbent in the vulcanization process. Table E shows that increasing moisture content in the adsorbent results in a substantial decrease in the scorch time of the formulation. The weight percent water is based on the weight of essentially water-free adsorbent following treatment (heating to 350° C. under high vacuum) to remove water.

TABLE E.—EFFECT OF MOLECULAR SIEVE CARRIERS FOR CURING ACCELERATORS AND SCORCH CHARACTERISTICS OF TYPE W NEOPRENE

| Accelerator | Conc. of accelerator (p.h.r.[1]) | Molecular sieve type | Weight percent accelerator on molecular sieve | Mooney scorch time[2] at 250° F. (min. to 5 pt. rise) | Press cure at 307° F., stress at 300% elongation | | |
|---|---|---|---|---|---|---|---|
| | | | | | 5 min. | 7 min. | 10 min. |
| None | | | | 30 | [3] | [3] | [3] |
| Salicylic acid | 0.5 | | | 5 | 1,230 | 1,170 | 1,200 |
| Do | 0.5 | Sodium X | 15 | 13 | 900 | 988 | 1,116 |
| Para-quinone-dioxime | 0.5 | | | 17 | 900 | 988 | 1,150 |
| Do | 0.5 | Sodium X | 15 | 33 | 560 | 640 | 960 |
| Tolylene-2,4-di-isocyanate[4] | 0.5 | | | 3.5 | 817 | 976 | 975 |
| Do.[4] | 0.5 | Sodium X | 10 | 10.5 | 829 | 732 | 847 |

[1] Parts of accelerator per hundred parts of rubber.
[2] Number of minutes required (at a given temperature) to reach a 5-point increase in the viscosity of the sample above the minimum viscosity of that sample as determined in a Mooney viscometer.
[3] No cure—Stress at 300% elongation was 462 p.s.i. after 15 min. at 307° F.
[4] Clay filler used in the formulation; see Example IV.

*Example IV*

COMPOUNDING OF TYPE W NEOPRENE FORMULATIONS USING ACCELERATORS OTHER THAN PYROCATECHOL LOADED ON MOLECULAR SIEVE TYPE SODIUM X

For the formulations containing salicylic acid and para-quinone-dioxime (see Table E), the compounding and testing procedure was similar to that described in Example I hereinabove.

For the formulation containing tolylene-2,4-di-isocyanate (Table E), a masterbatch consisting of 100 parts of neoprene type W, 75 parts of hard clay (Suprex clay) and 1 part of an antioxidant, Neozone A (phenyl-alpha-naphthylamine) was used. From this masterbatch, 352 grams were banded on a 6″ x 12″ laboratory 2-roll mill. To this were added 10.0 grams of zinc oxide, 4.0 grams of magnesium oxide, 1.0 gram of stearic acid and 5.0 grams of tolylene-2,4-diisocyanate loaded molecular sieve type sodium X. The formulation was compounded and the scorch and tensile tests were made according to the ASTM procedures cited in Example I above.

The Mooney scorch time for this formulation was 10.5

TABLE F.—EFFECT OF WATER CONTENT OF MOLECULAR SIEVE ON CURE AND SCORCH CHARACTERISTICS OF TYPE W NEOPRENE

| Weight percent water on sodium X | Weight percent catechol on sodium X | Mooney scorch time at 250° F. (min. to 5 pt. rise) | Press cure at 307° F., stress at 300% elongation (p.s.i.) | | |
|---|---|---|---|---|---|
| | | | 5 min. | 7 min. | 10 min. |
| 1 | 12.5 | 17 | 998 | 1,316 | 1,570 |
| 5 | 12.5 | 11.5 | 1,014 | 1,393 | 1,428 |
| 10 | 12.5 | 8.5 | 790 | 958 | 1,244 |
| 15 | 12.5 | 7.5 | 852 | 1,086 | 1,480 |

When a molecular sieve is used as the adsorbent, it should preferably be fully activated or nearly so; that is, it must contain less than about 2 weight percent water, in order to obtain the maximum advantage from the use of the accelerator-loaded sieve. The method of loading the accelerator on the molecular sieve apparently has very little effect on the performance of the accelerator. Loading the curing accelerator on molecular sieve by a vapor-phase process or by other suitable adsorption means gives similar results when compounded into type W neoprene formulations. The beneficial effects of activation, as illustrated by Table F above, and the relatively small effect of loading process employed also apply to the other crystalline zeolites which are useful in the present invention, for example zeolite L, zeolite Y and faujasite.

What is claimed is:

1. A composition of matter comprising a crystalline zeolitic molecular sieve adsorbent containing a curing accelerator for non-sulfur-modified polymers of chloroprene formulations, the pores of said zeolitic adsorbent being of large enough cross-sectional dimensions to adsorb said curing accelerator within said pores and said accelerator being one which is released from said zeolitic adsorbent when said zeolitic adsorbent is heated to temperatures up to the curing temperature of said polymers of chloroprene.

2. A composition of matter comprising a crystalline zeolitic molecular sieve adsorbent containing in the adsorbed state a curing accelerator for non-sulfur-modified polymers of chloroprene, the pores of said zeolitic adsorbent being of large enough cross-sectional dimensions to adsorb at least a substantial portion of the curing accelerator molecule within said pores and said accelerator being one which is released from said zeolitic adsorbent when said zeolitic adsorbent is heated to temperatures up to the curing temperature of said polymers of chloroprene.

3. A composition of matter comprising a previously activated synthetic crystalline zeolitic molecular sieve adsorbent containing in the adsorbed state a substantial quantity of a curing accelerator for non-sulfur-modified polymers of chloroprene, the pores of said synthetic zeolitic adsorbent being of large enough cross-sectional dimensions to adsorb at least a substantial portion of the curing accelerator molecule internally within said pores and said accelerator being releasable in at least one active form from synthetic zeolitic adsorbent when said zeolitic adsorbent is heated to temperatures up to the curing temperature of said polymers of chloroprene.

4. A composition of matter comprising a previously activated synthetic crystalline zeolitic molecular sieve adsorbent containing in the adsorbed state a substantial quantity of a curing accelerator for non-sulfur-modified polymers of chloroprene, the pores of said synthetic zeolitic adsorbent being of large enough cross-sectional dimensions to adsorb said accelerator internally within said pores, said accelerator being releasable in at least one active form from said synthetic zeolitic adsorbent when said zeolitic adsorbent is heated to temperatures up to the curing temperature of said polymers of chloroprene.

5. The composition in accordance with claim 4 wherein said synthetic zeolitic adsorbent is selected from the class consisting of zeolite X, zeolite L and zeolite Y.

6. The composition of matter in accordance with claim 4, wherein said curing accelerator is at least one member selected from the group consisting of dihydroxybenzenes, alkyl-substituted dihydroxybenzenes, di-isocyano-substituted benzenes, hydroxy-substituted benzoic acids, and diisonitroso-substituted benzenes.

7. The composition of matter in accordance with claim 4 wherein said curing accelerator is pyrocatechol.

8. The composition of matter in accordance with claim 4 wherein said curing accelerator is salicylic acid.

9. The composition of matter in accordance with claim 4 wherein said curing accelerator is tolylene-2,4-diisocyanate.

10. The composition of matter in accordance with claim 4 wherein said curing accelerator is para-quinone-dioxime.

11. A composition of matter comprising curable non-sulfur-modified polymers of chloroprene having incorporated therein a quantity of crystalline zeolitic molecular sieve adsorbent containing in the adsorbed state a curing accelerator at least a substantial portion of the accelerator molecule being internally adsorbed within the pores of said zeolitic adsorbent and said accelerator molecules being releasable in at least one active form from said zeolitic adsorbent when said adsorbent is heated to temperatures up to the curing temperature of said polymers of chloroprene.

12. A composition of matter comprising curable non-sulfur-modified polymers of chloroprene having incorporated therein a quantity of previously activated crystalline zeolitic molecular sieve adsorbent containing in the adsorbed state a curing accelerator, said accelerator being internally adsorbed within the pores of said zeolitic adsorbent and being releasable in at least one active form from said zeolitic adsorbent when said adsorbent is heated to temperatures up to the curing temperature of said polymers of chloroprene.

13. The composition of matter in accordance with claim 12 wherein said zeolitic adsorbent is a synthetic crystalline molecular sieve zeolite.

14. The composition in accordance with claim 13 wherein said synthetic zeolitic adsorbent is selected from the class consisting of zeolite X, zeolite L and zeolite Y.

15. The composition of matter in accordance with claim 12, wherein said curing accelerator is at least one member selected from the group consisting of dihydroxybenzenes, alkyl-substituted dihydroxybenzenes, di-isocyano-substituted benzenes, hydroxy-substituted benzoic acids, and diisonitroso-substituted benzenes.

16. The composition of matter in accordance with claim 12 wherein said accelerator is pyrocatechol.

17. The composition of matter in accordance with claim 12 wherein said accelerator is salicylic acid.

18. The composition of matter in accordance with claim 12 wherein said accelerator is tolylene-2,4-di-isocyanate.

19. The composition of matter in accordance with claim 12 wherein said accelerator is para-quinone-dioxime.

20. Process for the rapid curing of non-sulfur-modified polymers of chloroprene which comprises providing a curable non-sulfur-modified polymer of chloroprene formulation; incorporating therein a quantity of previously activated crystalline zeolitic molecular sieve adsorbent containing in the adsorbed state a curing accelerator, said zeolitic adsorbent having pores of large enough cross-sectional dimensions to adsorb said accelerator molecules within said pores and said curing accelerator being releasable in at least one active form from said zeolitic adsorbent by heating said zeolitic adsorbent to temperatures up to the curing temperature of said polymers of chloroprene formulation; and heating said formulation to said curing temperature whereby said accelerator is released from said zeolitic adsorbent and the rate of curing of said polymers of chloroprene is increased.

21. Process for the rapid curing of non-sulfur-modified polymers of chloroprene which comprises providing a curable non-sulfur-modified polymer of chloroprene formulation; adding to said polymers of chloroprene formulation separate quantities of activated crystalline zeolitic molecular sieve adsorbent and a curing accelerator, said zeolitic adsorbent having pores of large enough cross-sectional dimensions to adsorb said accelerator molecules within said pores and being present in sufficient quantity to adsorb essentially all of said accelerator, and said accelerator being releasable in at least one active form from said zeolitic adsorbent by heating said zeolitic adsorbent to temperatures up to the curing temperature of said polymers of chloroprene formulation; and heating said formulation to said curing temperature whereby said accelerator is desorbed from said zeolitic adsorbent and the rate of curing of said polymers of chloroprene is increased.

22. In a process for the rapid curing of non-sulfur-modified polymers of chloroprene formulations wherein said formulation includes a quantity of previously activated crystalline zeolitic molecular sieve adsorbent containing in the adsorbed state a curing accelerator, said zeolitic adsorbent having pores of large enough cross-sectional dimensions to adsorb said accelerator molecules within said pores, said curing accelerator being releasable in at least one active form from said zeolitic adsorbent by heating said zeolitic adsorbent to temperatures up to the curing temperature of said polymers of chloroprene formulation and wherein the processing variables of scorch time and cure rate must be controlled, the steps of (1) adjusting the accelerator-adsorbent ratio to provide a predetermined scorch time, (2) adjusting the amount of accelerator-containing adsorbent in said formulation to provide a predetermined rate of cure, and (3) releasing said accelerator from said adsorbent by heating said formulation to said curing temperature.

23. In a process for the rapid curing of non-sulfur-modified polymers of chloroprene formulations wherein separate quantities of activated crystalline zeolitic molecular sieve adsorbent and a curing accelerator are added to said formulation, said zeolitic adsorbent having pores of large enough cross-sectional dimensions to adsorb said accelerator molecules within said pores and being present in sufficient quantity to adsorb substantially all of said accelerator, said accelerator being releasable in at least one active form from said zeolitic adsorbent by heating said zeolitic adsorbent to temperatures up to the curing temperature of said polymers of chloroprene formulation, and wherein the processing variables of scorch time and cure rate must be controlled, the steps of (1) adjusting the accelerator-adsorbent ratio to provide a predetermined scorch time, (2) adjusting the amounts of accelerator and activated adsorbent in said formulation to provide a predetermined rate of cure, and (3) releasing said accelerator from said adsorbent by heating said formulation to said curing temperature.

References Cited in the file of this patent
UNITED STATES PATENTS

| | | |
|---|---|---|
| 1,782,353 | Jaeger et al. | Nov. 18, 1930 |
| 2,283,172 | Bates | May 19, 1942 |
| 2,508,262 | Jennings et al. | May 16, 1950 |

OTHER REFERENCES

Breck et al.: "J.A.C.S.," volume 78, No. 23, December 1956, pages 5963–5971.